United States Patent Office 2,842,528
Patented July 8, 1958

2,842,528

POLYMERIZATION OF FLUORINE-CONTAINING ETHYLENICALLY UNSATURATED COMPOUNDS

Ralph L. Herbst, Jr., Westfield, and Billy F. Landrum, Belleville, N. J., assignors, by mesne assignments, to Minnesota Mining and Manufacturing Company, St. Paul, Minn., a corporation of Delaware No Drawing. Application March 29, 1955
Serial No. 497,822

7 Claims. (Cl. 260—87.5)

This invention relates to a method for the preparation of polymeric fluorine-containing ethylenically unsaturated compounds.

The fluorine-containing ethylenically unsaturated compounds which may be polymerized in accordance with the method of the present invention preferably have not in excess of about 4 carbon atoms. Exemplary of the compounds contemplated are chlorotrifluoroethylene, tetrafluoroethylene, 1-chloro-1-fluoroethylene, dichlorodifluoroethylene, trifluoroethylene, perfluorobutadiene, 1,1-difluorobutadiene, 1,1,2-trifluorobutadiene, 1,1,3-trifluorobutadiene, perfluoropropene, phenyltrifluoroethylene, alpha-methylphenyldifluoroethylene, perfluorocyclobutene, and vinylidene fluoride. The process of the present invention applies to the homopolymerization of these monomers and also the copolymerization thereof. For example, the process of the invention may be utilized to copolymerize chlorotrifluoroethylene and tetrafluoroethylene, chlorotrifluoroethylene and vinylidene fluoride, chlorotrifluoroethylene and vinyl fluoride, chlorotrifluoroethylene and vinyl chloride, chlorotrifluoroethylene and perfluoropropene, and chlorotrifluoroethylene and trifluoroethylene. In copolymerization reactions the comonomer is preferably a fluorinated olefin and also is preferably at least difluorinated. When less than 5 weight percent of comonomer is copolymerized with the primary monomer, the copolymerization is broadly included within the term homopolymerization.

A water suspension type catalyst system is used in the process of the present invention in which a redox catalyst system, comprising an oxidant and a reductant, is preferred. The oxidant used is tertiary-butyl peracetate, while the reductant is preferably a bisulfite, such at potassium bisulfite, sodium bisulfite, potassium metabisulfite, or sodium metabisulfite. The tertiary-butyl peracetate in the suspension redox recipe comprises between about 0.1 and 5 parts by weight per 100 parts of total monomer or monomers present and preferably comprises between about 0.5 and 2 parts by weight per 100 parts of total monomer or monomers present. The reductant, such as sodium metabisulfite, may comprise between about 0.05 and about 5.0 parts by weight per 100 parts of total monomer or monomers present and preferably comprises between about 0.1 and about 2 parts by weight per 100 parts of total monomer or monomers present.

About 0.01 to about 1 part by weight per 100 parts of total monomer or monomers present of a variable valence metal salt is also used. The variable valence metal salt is preferably an iron salt, such as ferrous sulfate or ferrous nitrate, and it is used as an activator.

The temperature of the reaction may be in the range of about 0 to 60° C., preferably about 5 to 25° C. The pressure of the reaction may be between about atmospheric pressure and 1200 p. s. i. g. As a matter of convenience, however, the polymers are prepared under autogenous conditions of pressure, i. e., about 50 to 250 p. s. i. g. The reaction time may be between about 1 hour and 100 hours, preferably about 5 to 75 hours.

The water to monomer ratio may be from about 1 to 8, or more, parts of water per part of monomer or monomers present, on a weight basis. When a ratio of less than about 2 parts of water per part of monomer or monomers is used, the rate of conversion of the monomer to polymer shows a tendency to decrease.

The pH of the reaction mixture should be in the range of about 1 to 4, preferably about 2.5 to 4. When a pH outside of this range is used, there is also a tendency toward lower conversion rates. The pH may be adjusted to make the reaction mixture more acidic by the addition of acidic material such as hydrochloric acid, sulfuric acid, and nitric acid. To ake the reaction mixture more alkaline, the pH may be adjusted by adding potassium hydroxide, sodium hydroxide, and the like.

The invention will be further illustrated by reference to the following specific examples:

EXAMPLE 1

A series of glass polymerization tubes was charged with the ingredients listed in the table below. All the reagents were freshly prepared using deaerated, deionized water. The order of addition of the reagents was water, sodium bisulfite, tertiary-butyl peracetate, potassium hydroxide, citric acid (used to solubilize ferrous sulfate in the monomer phase), and lastly, ferrous sulfate. The chlorotrifluoroethylene was charged in the liquid phase. The tubes were frozen after the addition of each of the ingredients.

The tubes were then sealed in vacuo at the temperature of liquid nitrogen and were then shaken in a water bath, the temperature of which was automatically controlled at the temperatures listed in the table below. At the end of the reaction time indicated, the tubes were frozen, vented, and opened. The polymers were collected, washed several times with hot water, and dried to constant weight in a vacuum oven set at a temperature of 35° C. Samples of the polymer products were then pressed, and no strength temperature determinations (N. S. T.) were made. The N. S. T. determinations were made in accordance with the method described in U. S. Patent No. 2,689,241.

Table 1

| Tube No. | Mls. $CF_2=CFCl$ | Mls. $H_2O$ | Mls. 2.5% $NaHSO_3$ | Mls. 1.25% t-butyl peracetate | Mls. 1% KOH | Mls. 0.1% citric acid | Mls. 2.5% $FeSO_4$ | Temp., °C. | Time, hrs. | Grams | Percent yield | N. S. T., °C | Pressing temperature |
|---|---|---|---|---|---|---|---|---|---|---|---|---|---|
| 1 | 31.25 | 64.0 | 13.0 | 10.0 | None | None | 13.0 | 25 | 20.0 | 10.6 | 21.2 | Wet | 475° F. |
| 2 | 31.25 | 64.0 | 13.0 | 10.0 | None | None | 13.0 | 25 | 20.0 | 13.5 | 27.0 | Bubbled | Do. |
| 3 | 31.25 | 62.0 | 13.0 | 10.0 | None | 2.0 | 13.0 | 25 | 20.0 | 14.6 | 29.2 | 275 | 440° F. |
| 4 | 31.25 | 62.0 | 13.0 | 10.0 | None | 2.0 | 13.0 | 25 | 20.0 | 17.7 | 35.4 | 277 | Do. |
| 5 | 31.25 | 59.5 | 13.0 | 10.0 | 2.5 | 2.0 | 13.0 | 25 | 20.0 | 15.9 | 31.8 | 283 | 440° F. solid polymer. |
| 6 | 31.25 | 59.5 | 13.0 | 10.0 | 2.5 | 2.0 | 13.0 | 25 | 20.0 | 15.9 | 31.4 | 276 | Do. |
| 7 | 31.25 | 77.5 | 40.0 | 1.0 mls. pure | 2.5 | 2.0 | 2.0 | 25 | 20.0 | 47.5 | 95.0 | 232 | 440° F. "pearls." |
| 8 | 31.25 | 77.5 | 40.0 | t-Butyl peracetate | 2.5 | 2.0 | 2.0 | 25 | 20.0 | 45.9 | 91.8 | 232 | 440° F. |

It will be seen from the above results that all of the polymer products had N. S. T. values within the plastic range.

EXAMPLE 2

A second series of polymerizations was run using the same charging procedure employed in Example 1 above. The quantities of reagents used and the results obtained are as follows:

*Table 2*

| Tube No. | Mls. $CF_2=CFCl$ | Mls. $H_2O$ | Mls. 2.5% $NaHSO_3$ | Mls. t-butyl peracetate | Mls. 1% KOH | Mls. 0.1% citric acid | Mls. 1.25% $FeSO_4$ | Time, hrs. | Temp., °C. | Grams | Percent yield | N.S.T., °C. | Pressing temp., °F. |
|---|---|---|---|---|---|---|---|---|---|---|---|---|---|
| 1 | 31.25 | 79.3 | 40.0 | 1.0 | 2.5 | 2.0 | 0.2 | 20.0 | 25.0 | 16.0 | 32.0 | 235 | 440 |
| 2 | 31.25 | 79.3 | 40.0 | 1.0 | 2.5 | 2.0 | 0.2 | 20.0 | 25.0 | 19.6 | 39.2 | 229 | 475 |
| 3 | 31.25 | 78.9 | 40.0 | 1.0 | 2.5 | 2.0 | 0.6 | 20.0 | 25.0 | 45.8 | 91.6 | 251 | 440 |
| 4 | 31.25 | 78.9 | 40.0 | 1.0 | 2.5 | 2.0 | 0.6 | 20.0 | 25.0 | 43.0 | 86.0 | 240 | 440 |
| 5 | 31.25 | 78.5 | 40.0 | 1.0 | 2.5 | 2.0 | 1.0 | 20.0 | 25.0 | 46.2 | 92.4 | 246 | 440 |
| 6 | 31.25 | 98.0 | 20.0 | 0.50 | 2.5 | 2.0 | 2.0 | 20.0 | 25.0 | 40.5 | 81.0 | 252 | 440 |
| 7 | 31.25 | 98.0 | 20.0 | 0.50 | 2.5 | 2.0 | 2.0 | 20.0 | 25.0 | 41.4 | 82.8 | 229 | 440 |

It will be seen from the above results that all of the polymer products had N. S. T. values within the plastic range. (N. S. T. values between 220° C. and about 340° C. are considered to be in the plastic range.)

It will be obvious to those skilled in the art that many modifications may be made within the scope of the present invention without departing from the spirit thereof, and the invention includes all such modifications.

We claim:

1. A process which comprises polymerizing chlorotrifluoroethylene in an aqueous suspension medium having a pH between about 1 and about 4 consisting essentially of water in a ratio in exces of 1:1 to monomer, and comprising water, tertiary butyl peracetate, a water soluble inorganic reducing agent, and a water soluble salt of iron.

2. A process which comprises polymerizing trifluorochloroethylene in an aqueous suspension medium having a pH between about 1 and about 4 consisting essentially of water in a ratio in excess of 1:1 to monomer, and comprising water, tertiary butyl peracetate, sodium bisulfite, and a water soluble salt of iron.

3. A process which comprises polymerizing trifluorochloroethylene in an aqueous suspension medium having a pH between about 1 and about 4 consisting essentially of water in a ratio in excess of 1:1 to monomer, and comprising water, tertiary butyl peracetate, sodium bisulfite, and ferrous sulfate.

4. A process which comprises polymerizing trifluorochloroethylene in an aqueous suspension medium having a pH between about 1 and about 4 consisting essentially of water in a ratio in excess of 1:1 to monomer, and comprising water, tertiary butyl peracetate, a water soluble inorganic reducing agent, and ferrous sulfate.

5. A process according to claim 3 in which the fluorine-containing ethylenically unsaturated compound is chlorotrifluoroethylene copolymerized with vinylidene fluoride.

6. A process according to claim 3 in which the fluorine-containing ethylenically unsaturated compound is chlorotrifluoroethylene copolymerized with trifluoroethylene.

7. A process according to claim 3 in which the fluorine-containing ethylenically unsaturated compound is chlorotrifluoroethylene copolymerized with vinyl chloride.

References Cited in the file of this patent

UNITED STATES PATENTS

| 2,531,134 | Kropa et al. | Nov. 21, 1950 |
| 2,631,203 | Myers | Oct. 7, 1952 |
| 2,689,241 | Dittman et al. | Sept. 14, 1954 |